United States Patent
Wang et al.

(10) Patent No.: US 10,455,513 B2
(45) Date of Patent: Oct. 22, 2019

(54) POWER CONTROL METHOD AND APPARATUS IN V2X COMMUNICATION

(71) Applicant: Samsung Electronics Co., Ltd., Gyeonggi-do (KR)

(72) Inventors: Yi Wang, Beijing (CN); Yingyang Li, Beijing (CN); Shichang Zhang, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/071,779

(22) PCT Filed: Feb. 6, 2017

(86) PCT No.: PCT/KR2017/001310
§ 371 (c)(1),
(2) Date: Jul. 20, 2018

(87) PCT Pub. No.: WO2017/135802
PCT Pub. Date: Aug. 10, 2017

(65) Prior Publication Data
US 2019/0028974 A1    Jan. 24, 2019

(30) Foreign Application Priority Data
Feb. 4, 2016   (CN) .......................... 2016 1 0079854

(51) Int. Cl.
*H04W 52/10*   (2009.01)
*H04W 52/24*   (2009.01)
(Continued)

(52) U.S. Cl.
CPC ............. *H04W 52/10* (2013.01); *H04W 4/40* (2018.02); *H04W 4/70* (2018.02);
(Continued)

(58) Field of Classification Search
CPC ..... H04W 4/40; H04W 4/70; H04W 52/0209; H04W 52/10; H04W 52/243; H04W 52/283; H04W 52/285
(Continued)

(56) References Cited

U.S. PATENT DOCUMENTS

2013/0329651 A1* 12/2013 Lee ...................... H04W 52/04
                                                      370/329
2014/0169331 A1*  6/2014 Yang .................... H04W 52/40
                                                      370/331
(Continued)

FOREIGN PATENT DOCUMENTS

WO    WO 2015/142082    9/2015

OTHER PUBLICATIONS

PCT/ISA/210 Search Report issued on PCT/KR2017/001310 (pp. 3).
(Continued)

*Primary Examiner* — Tan H Trinh
(74) *Attorney, Agent, or Firm* — The Farrell Law Firm, P.C.

(57) ABSTRACT

The present application provides a power control method in a V2X communication, comprising the following steps of: acquiring, by a UE, power control parameters of a Physical V2X Shared Channel (PVSCH) or a Physical V2X Control Channel (PVCCH) in a V2X communication, the power control parameters comprising a second basic open-loop power, the second basic open-loop power reflecting an interrelationship between different V2X UEs; and, determining, by the UE, a transmission power of the PVSCH or the PVCCH according to the acquired power control parameters. With the present application, the performance of the V2X communication can be improved, and the power consumption of a V2X terminal can be reduced.

15 Claims, 1 Drawing Sheet

(51) Int. Cl.
*H04W 52/28* (2009.01)
*H04W 52/02* (2009.01)
*H04W 4/40* (2018.01)
*H04W 4/70* (2018.01)

(52) U.S. Cl.
CPC ..... *H04W 52/0209* (2013.01); *H04W 52/243* (2013.01); *H04W 52/283* (2013.01); *H04W 52/285* (2013.01)

(58) Field of Classification Search
USPC ........ 455/41.1, 41.2, 69, 522, 509; 370/231, 370/331; 340/901
See application file for complete search history.

(56) References Cited

U.S. PATENT DOCUMENTS

| | | | | |
|---|---|---|---|---|
| 2015/0091740 A1* | 4/2015 | Bai | .................. | G08B 21/06 340/901 |
| 2015/0156662 A1* | 6/2015 | Bai | .................. | H04W 4/027 370/231 |
| 2016/0112962 A1* | 4/2016 | Park | .................. | H04W 52/243 455/522 |
| 2016/0135128 A1* | 5/2016 | Lee | .................. | H04W 52/10 370/311 |
| 2017/0019812 A1* | 1/2017 | Lee | .................. | H04W 76/14 |
| 2017/0094614 A1* | 3/2017 | Tosa | .................. | H04W 52/38 |
| 2018/0115970 A1* | 4/2018 | Chae | .................. | H04W 72/02 |
| 2018/0124707 A1* | 5/2018 | Lee | .................. | H04W 52/10 |
| 2018/0199223 A1* | 7/2018 | Kim | .................. | H04W 24/10 |
| 2018/0249429 A1* | 8/2018 | Zhang | .................. | H04W 52/18 |
| 2018/0302768 A1* | 10/2018 | Uchiyama | .................. | G08G 1/166 |
| 2018/0317221 A1* | 11/2018 | Yasukawa | .................. | H04W 4/04 |
| 2018/0359707 A1* | 12/2018 | Chae | .................. | H04W 52/10 |
| 2019/0045456 A1* | 2/2019 | Seo | .................. | H04W 4/40 |
| 2019/0068318 A1* | 2/2019 | Marinier | .................. | H04L 1/0065 |
| 2019/0090108 A1* | 3/2019 | Wei | .................. | H04W 4/46 |

OTHER PUBLICATIONS

PCT/ISA/237 Written Opinion issued on PCT/KR2017/001310 (pp. 6).

Oh, Sung-Min et al., Efficient Interference Control Technology for Vehicular Moving Networks, ETRI Journal, vol. 37, No. 5, Oct. 31, 2015, Copyright 2015 ETRI, pp. 867-876.

3GPP TR 36.885 V0.4.0, Dec. 4, 2015, 3rd Generation Partnership Project; Technical Specification Group Radio Access Network; Study on LTE-based V2X Services; . . . .
(Release 14), Copyright 2013, 3GPP Organization Partners (ARIB, ATIS, CCSA, ETSI, TTA, TTC), pp. 62.

* cited by examiner

POWER CONTROL METHOD AND APPARATUS IN V2X COMMUNICATION

PRIORITY

This application is a National Phase Entry of PCT International Application No. PCT/KR2017/001310 which was filed on Feb. 6, 2017, and claims priority to Chinese Patent Application No. 201610079854.2, which was filed on Feb. 4, 2016, the content of each of which is incorporated herein by reference.

TECHNICAL FIELD

The present application relates to the technical field of mobile communications, and in particular to a power control method and apparatus in Vehicle to X (V2X) communication.

BACKGROUND ART

At present, due to its great potential value in the public safety field and the ordinary civil communication field, the Device to Device (D2D) communication technology has been accepted by the 3GPP standards, and has realized the standardization of a part of functions in the 3GPP Rel-12 and Rel-13, including the mutual discovery of D2D terminals in a In Coverage (IC) scenario, a Partial Coverage (PC) scenario and an Out of Coverage (OC) scenario, and the broadcast communications between D2D terminals.

At present, two D2D broadcast communication modes (Mode 1 and Mode 2 for short) have been defined in the 3GPP Rel-12. Wherein, Mode 1 requires that a UE transmitting D2D broadcast communication must be a UE in coverage of a cellular network (ICUE). The UE acquires configuration information of a D2D Scheduling Assignment (SA) resource pool of Mode 1 by receiving a system broadcast signaling transmitted by an eNB, the configuration information containing the cycle of the SA and the position of a subframe for transmitting the SA in each cycle. When a UE supporting the Mode 1 broadcast communication has data, the UE applies for a dedicated Mode 1 communication resource from the eNB by a particular Buffer Status Report (BSR). Subsequently, the UE detects a D2D grant of the eNB before each SA cycle, and acquires the position of a resource for transmitting the SA and data in this SA cycle. In Mode 1, the collision of resources between different UEs can be avoided through the centralized control by the eNB.

A UE transmitting a D2D broadcast communication by Mode 2 can be an ICUE, or a UE out of coverage of the cellular network (OCUE). The ICUE acquires an SA resource pool for the Mode 2 and a corresponding data resource pool configuration by receiving a system broadcast signaling from the eNB, and then randomly selects the transmitting resource for the SA and corresponding data in each SA cycle; the OCUE determines an SA resource pool for the Mode 2 and a corresponding data resource pool configuration through preconfiguration information, the way of selecting a resource is the same as the ICUE. In a PC scenario, the Mode 2 resource pool configuration preconfigured by the OCUE is related to a carrier frequency of a cell of an ICUE participating in the D2D broadcast communication, a system bandwidth and/or a TDD configuration.

Since the standardized D2D communication in the 3GPP Rel-12/13 is mainly specific to low-speed terminals, as well as services with lower requirements on the time delay sensitivity and receiving reliability, the realized D2D functions are far unable to meet the user demands. Accordingly, in the subsequent 3GPP versions, further enhancing the functional framework of D2D has become a broad consensus for various communication terminal manufacturers and communication network equipment manufacturers nowadays. Wherein, based on the current D2D broadcast communication mechanism, supporting low-delay and high-reliability direct communications between high-speed equipments, between a high-speed equipment and a low-speed equipment and between a high-speed equipment and a static equipment (i.e., V2X (Vehicle to Vehicle/Pedestrian/Infrastructure/Network) is one of functions to be standardized preferentially. Compared with the existing D2D communication environment, in a V2X communication environment, the average movement speed of a transceiver is far higher than that in the existing D2D communication environment. In addition, the density of transmitting users is considered to be low (there are three transmitting users in one cell) in the D2D communication mechanism design process, and in contrast, the density of transmitting equipments in the V2X even in a typical traffic environment is higher than that in the D2D. If a special traffic environment (e.g., a traffic jam situation) is taken into consideration, a difference in the density of transmitting equipments will be larger. In accordance with the conclusions from the 3GPP at present, the V2X communication still follows the Mode 2 of the D2D broadcast communication. If the density of transmitting terminals within a certain region is very high, the use of the Mode 2 communication mode will inevitably cause serious resource collision and in-band emission and further influence the communication reliability.

In addition, compared with the D2D communication, the V2X communication has higher requirements on the time delay and reliability. At present, the 3GPP has clearly stipulated that the minimum time delay for the V2X is 20 ms, and has also provided requirements on high reliability. However, in the existing D2D design process, the requirements on the two aspects have not yet been used as main consideration factors. Therefore, the existing D2D communication cannot meet the requirements on both the time delay and the reliability in the V2X communication.

DISCLOSURE OF INVENTION

Technical Problem

An objective of the present application is to solve at least one of the technical defects described above, and particularly to provide a power control method for a transmitting terminal in a V2X communication environment, which can improve the communication performance of the V2X.

Solution to Problem

To realize this objective, the present application adopts the following technical solutions.

A power control method in a V2X communication is provided, comprising the following steps of:

acquiring, by a User Equipment (UE), power control parameters of a Physical V2X Shared Channel (PVSCH) or a Physical V2X Control Channel (PVCCH) in a V2X communication, the power control parameters comprising a second basic open-loop power, the second basic open-loop power reflecting an interrelationship between different V2X UEs; and determining, by the UE, a transmission power of the PVSCH or the PVCCH according to the acquired power control parameters.

Preferably, the step of determining a transmission power of the PVSCH or the PVCCH according to the acquired power control parameters comprises:

by the UE, selecting, from the acquired power control parameters, a parameter value corresponding to a current UE state, and determining a transmission power of the PVSCH or the PVCCH according to the selected parameter value.

Preferably, the power control parameters comprise one or more sets, and the sets comprise a multiple of parameter values corresponding to different UE states; and the selecting a parameter value corresponding to a current UE state comprises: determining, from the sets, a parameter value corresponding to the current state according to the current UE state.

Preferably, the UE state is one of or a combination of several of the following: an absolute movement velocity range of a UE, a service type corresponding to data transmitted by a UE, a relative distance range between a UE and a potentially dangerous vehicle, a relative movement velocity range between UEs, a geographic location range of a UE and a UE density range in an environment of a UE.

Preferably, the power control parameters are acquired by receiving a configuration signaling from an eNB or by preconfiguration.

Preferably, when the UE is located within an In Coverage (IC) range, the power control parameters are acquired by receiving a configuration signaling from an eNB;

the power control parameters comprise: a maximum PVSCH/PVCCH transmission power $P_{CMAX\_PVSCH}/P_{CMAX\_PVCCH}$ configured by the eNB, a first basic open-loop power $P_{o\_PVSCH}/P_{o\_PVCCH}$ for a PVSCH/PVCCH resource pool or a set region, a path loss compensation factor $\alpha_{PVSCH}/\alpha_{PVCCH}$ for the PVSCH/PVCCH resource pool or the set region, and a second basic open-loop power $P_{o\_PVSCH\_PC5}/P_{o\_PVCCH\_PC5}$ for the PVSCH/PVCCH resource pool or the set region; and the determining a transmission power of the PVSCH comprises: $PVSCH=\min\{P_{CMAX\_PVSCH}, 10\log(M_{PVSCH})+P_{o\_PVSCH\_PC5}, 10\log(M_{PVSCH})+P_{o\_PVSCH}+\alpha_{PVSCH}*PL_c\}$; and/or, the determining a transmission power of the PVCCH comprises: $P_{PVCCH}=\min\{P_{CMAX\_PVCCH}, 10\log(M_{PCCCH})+P_{o\_PVCCH\_PC5}, 10\log(M_{PVCCH})+P_{o\_PVCCH}+\alpha_{PVCCH}*PL_c\}$;

where $M_{PVSCH}/M_{PVCCH}$ is the number of Physical Resource Blocks (PRBs) occupied by the PVSCH/PVCCH, $PL_c$ is a path loss of a UE relative to the eNB, and "/" denotes "or".

Preferably, when the UE is located within an IC range, the power control parameters are acquired by receiving a configuration signaling from an eNB;

the power control parameters comprise: a maximum transmission power $P_{CMAX\_PVSCH}/P_{CMAX\_PVCCH}$ configured by the eNB for a PVSCH/PVCCH resource pool or a set region, a first basic open-loop power $P_{o\_PVSCH}/P_{o\_PVCCH}$ for the PVSCH/PVCCH resource pool or the set region, a path loss compensation factor $\alpha_{PVSCH}/\alpha_{PVCCH}$ for the PVSCH/PVCCH resource pool or the set region, and a second basic open-loop power set $\{P_{o\_PVSCH\_PC5,i}, 10 \geq i \geq I-1\}/\{P_{o\_PVCCH\_PC5,i}, 0 \leq i < I-1\}$ for the PVSCH/PVCCH resource pool or the set region, wherein different parameter values in the second basic open-loop power set correspond to different UE states, and I is a positive integer predefined or configured by the eNB; and the determining a transmission power of the PVSCH according to the selected parameter value comprises:

$P_{PVSCH}=\text{Min}\{P_{CMAX\_PVSCH}, 10\log(M_{PVSCH})+P_{o\_PVSCH\_PC5,J}, 10\log(M_{PVSCH})+P_{o\_PVSCH}+\alpha_{PVSCH}*PL_c\}$;

and/or, the determining a transmission power of the PVCCH according to the selected parameter value comprises: $P_{PVCCH}=\min\{P_{CMAX\_PVCCH}, 10\log(M_{PCCCH})+P_{\alpha\_PVCCH\_PC5,J}, 10\log(M_{PVCCH})+P_{o\_PVCCH}+\alpha_{PVCCH}*PL_c\}$;

where $M_{PVSCH}/M_{PVCCH}$ is the number of PRBs occupied by the PVSCH/PVCCH, $PL_c$ is a path loss of a UE relative to the eNB, and "/" denotes "or".

Preferably, when the UE is located within an IC range, the power control parameters are acquired by preconfiguration;

the power control parameters comprise: a preconfigured maximum transmission power $P_{CMAX\_PVSCH\_pre}/P_{CMAX\_PVCCH\_pre}$ and a second basic open-loop power set $\{P_{o\_PVSCH\_PC5\_pre,i}, 0 \leq i < I-1\}/\{P_{o\_PVCCH\_PC5\_pre,i}, 0 \leq i < I-1\}$ for a PVSCH/PVCCH resource poor, wherein different parameter values in the second basic open-loop power set correspond to different UE states, and the determining a transmission power of the PVSCH comprises: $P_{PVSCH}=\min\{P_{CMAX\_PVSCH\_pre}, 10\log(M_{PVSCH})+P_{o\_PVSCH\_PC5\_pre,J}\}$; and/or, the determining a transmission power of the PVCCH comprises: $P_{PVCCH}=\min\{P_{CMAX\_PVCCH\_pre}, 10\log(M_{PCCCH})+P_{o\_PVCCH\_PC5\_pre,J}\}$;

where $M_{PVSCH}/M_{PVCCH}$ is the number of PRBs occupied by the PVSCH/PVCCH.

Preferably, a UE state corresponding to different parameter values of the second basic open-loop power is an absolute movement velocity range; and when selecting a parameter value corresponding to the current UE state, for the second basic open-loop power, an absolute movement velocity range into which an absolute movement velocity $V_a$ falls is determined according to the current absolute movement velocity $V_a$ of the UE, and a parameter value $P_{o\_PVSCH\_PC5,J}$ corresponding to the absolute movement velocity range is selected, where J is an index of the selected parameter value.

Preferably, the absolute movement velocity range is configured by the eNB or preset; or, if $i < I-1$, the absolute movement velocity range corresponding to $P_{o\_PVSCH\_PC5,i}/P_{o\_PVCCH\_PC5,i}$ is $[iV_{max}/I, (i+1)V_{max}/I)$; and, if $i = I-1$, the absolute movement velocity range corresponding to $P_{o\_PVSCH\_PC5,i}/P_{o\_PVCCH\_PC5,i}$ is $[iV_{max}/I, +\infty)$, where $V_{max}$ is a maximum UE absolute velocity predefined or configured by the eNB.

Preferably, a way of determining a current absolute movement velocity $V_a$ of the UE comprises: using a current instant movement velocity $V_I$ of the UE as the $V_a$; or $V_a = V_1 + 0.5 A_1$, where $A_1$ is a current instant acceleration; or $V_a = V_1 + \Delta A_1$, where $\Delta$ is an expected physical layer delay or a half of the expected physical layer delay of data carried by the PVSCH/PVCCH.

Preferably, $J = \lfloor V_a I / V_{max} \rfloor$, where Vmax is a maximum UE absolute velocity predefined or configured by the eNB.

Preferably, a UE state corresponding to different parameter values of the second basic open-loop power is a relative distance range between a UE and a potentially dangerous vehicle; and when selecting a parameter value corresponding to the current UE state, for the second basic open-loop power, a relative distance range into which a maximum relative distance falls is determined according to the maximum relative distance between the current UE and the potentially dangerous vehicle, and a parameter value $P_{o\_PVSCH\_PC5,J}$ corresponding to the relative distance range is selected, wherein J is an index of the selected parameter value.

Preferably, the relative distance range is configured by the eNB or preset; or, the relative distance range corresponding to $P_{o\_PVSCH\_PC5,i}/P_{o\_PVCCH\_PC5,i}$ is $[iD_{max}/I,(i+1)D_{max}/I)$, where $D_{max}$ is a maximum relative distance predefined or configured by the eNB.

Preferably, a vehicle with a relative distance to the UE smaller than $D_{max}$ is used as a potentially dangerous vehicle; and when the relative distance range corresponding to $P_{o\_PVSCH\_PC5,i}/P_{o\_PVCCH\_PC5,i}$ is $[iD_{max}/I,(i+1)D_{max}/I)$, $J=I\lfloor \max(D_{r,j})I/D_{max}\rfloor$, where $\max(D_{r,j})$ denotes the maximum relative distance.

Preferably, a vehicle with a time for meeting the current UE smaller than T is used as a potentially dangerous vehicle; or, the UE itself determines a criteria for a potentially dangerous vehicle.

Preferably, if there is no potentially dangerous vehicle, the method comprises: by the UE, stopping transmitting the PVSCH/PVCCH, or transmitting the PVSCH/PVCCH at a minimum power.

Preferably, when the second basic open-loop power is a set comprising a multiple of parameter values, the higher the velocity indicated by the absolute movement velocity range of the UE is, the higher the second basic open-loop power is; and/or the larger the distance indicated by the relative distance range between the UE and the potentially dangerous vehicle is, the higher the second basic open-loop power is; and/or, the higher the velocity indicated by the relative movement velocity range between UEs is, the higher the second basic open-loop power is; and/or, the larger the density indicated by the UE density range in the environment of the UE is, the lower the second basic open-loop power is.

Preferably, the power control parameters are determined by one or more of the following information:

a cell where the UE is located currently, a frequency of a transmitting carrier where the UE is located currently, a transmitting resource pool where the UE is located currently, and a service type corresponding to data to be transmitted by the UE currently.

Preferably, in the sets, a correspondence between UE states and parameter values is configured by the eNB or preset.

A power control apparatus in a V2X communication is provided, comprising a parameter acquisition unit and a power control unit;

the parameter acquisition unit is configured to acquire power control parameters of a PVSCH or a PVCCH in a V2X communication, the power control parameters comprising a second basic open-loop power, the second basic open-loop power reflecting an interrelationship between different V2X UEs; and the power control unit is configured to determine a transmission power of the PVSCH or the PVCCH according to the acquired power control parameters.

Advantageous Effects of Invention

In the technical solutions provided by the present application, a UE acquires power control parameters of a PVSCH or a PVCCH in a V2X communication, and then determines a transmission power of the PVSCH or the PVCCH according to the acquired power control parameters. Wherein, the acquired power control parameters comprise a second basic open-loop power reflecting an interrelationship between different V2X UEs. Accordingly, the communication performance of the V2X can be improved according to the determined transmission power.

More specifically, for an In Coverage (IC) UE, resource-pool-specific or region-specific power parameters can be determined by receiving a signaling from an eNB; then, the UE selects a corresponding power control parameter according to the resource pool the region where the UE is located and an absolute movement velocity selected by the UE itself or according to a relative distance to a potentially dangerous vehicle, and adjusts the power of PVSCH and the PVCCH. For an Out Coverage (OC) UE, a corresponding power control parameter is acquired by preconfiguration, and the transmission power of the PVSCH and the transmission power of the PVCCH are adjusted in a way similar to power control mode in the ICUE. By the method provided by the present invention, according to the characteristics of a vehicle transmitting a PVSCH/PVCCH in a certain resource pool or a terminal executing a V2X operation in a region, a transmission power of the terminal can be adjusted. Accordingly, the mutual interference between terminals can be effectively reduced, the communication performance of V2X can be improved, and the power consumption of a V2X terminal can be reduced.

MODE FOR THE INVENTION

To make the objectives, technical solutions and advantages of the present application clearer, the present application will be further described below in details by embodiments with reference to the accompanying drawings.

Hereinafter, unless otherwise specifically stated, the UE refers to a terminal supporting a V2X function.

As can be seen from the solutions described in the background art, the movement velocity and density of transmitting equipments in a V2X communication environment are far higher than those in the D2D communication environment, and the time delay and reliability of data transmission are also highly required in the V2X communication. Specifically, in the V2X communication, if the resource broadcast mechanism of Mode 2 in the Rel-12/13 is still followed, it is very difficult to avoid the collision between different transmitting-side resources when the density on the transmitting side is very large, since transmitting resources on the transmitting side are present in a random manner; meanwhile, the in-band emission will have non-negligible negative influences on the V2X communication. To solve these problems, it is required to reduce the influences from the resource collision and in-band emission. For this purpose, controlling the transmission power of a transmitting equipment is the most effective means. In addition, in an actual traffic environment, to ensure the travel safety of pedestrians, handheld equipments of the pedestrians also need to participate in the periodic transmission of V2X information, and a reasonable and effective power control mechanism facilitates the reduction of power loss of such terminal equipments and the improvement of the endurance time of the equipments. Therefore, the present invention provides a power control method for a Physical V2X Shared Channel (PVSCH) for performing data transmission and a Physical V2X Control Channel (PVCCH) for controlling information transmission of a V2X transmitting terminal, which can effectively reduce the mutual interference between terminals and improve the performance of the V2X communication.

Figure 1:
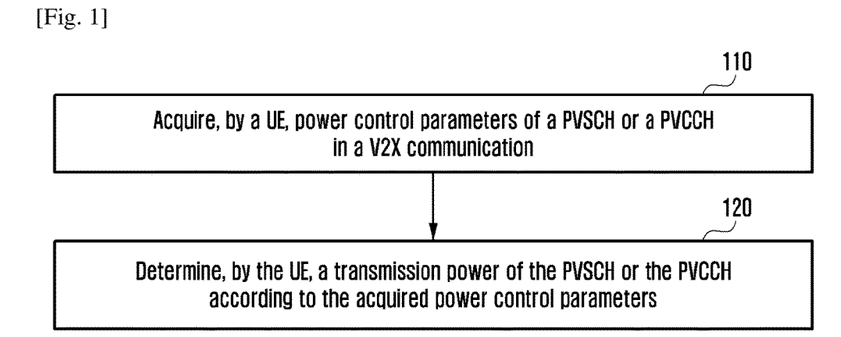
FIG. 1 is a flowchart of a power control method in a V2X communication according to the present application.

FIG. 1 shows a power control method for a PVSCH or a PVCCH of a V2X transmitting terminal. As shown in FIG. 1, the method specifically comprises the following steps.

Step 110: By a UE, power control parameters of a PVSCH or a PVCCH in a V2X communication are acquired.

The UE can acquire the power control parameters by receiving a signaling from an eNB or by preconfiguration. Preferably, the acquired power control parameters comprise a second basic open-loop power. This parameter is a power control parameter distinguished from the parameter in the existing D2D communication, and this parameter reflects an interrelationship between different V2X UEs, so that the mutual interference between different V2X UEs can be reduced in accordance with this parameter.

In addition, the power configuration parameters can be related to one or more of a cell where the UE is located currently, a frequency of a transmitting carrier where the UE is located currently, a transmitting resource pool where the UE is located currently, and a service type corresponding to data to be transmitted by the UE currently.

Step 120: By the UE, a transmission power of the PVSCH and a transmission power of the PVCCH are determined according to the acquired power control parameters.

The UE determines a transmission power of the PVSCH and a transmission power of the PVCCH according to the information determined in step 110.

Now, the basic power control method flow in the present application is finished. In this flow, to further improve the effects of interference control between UEs, one or more of the power control parameters can be a set, and different parameters in the set correspond to different states of corresponding UEs. The UE state can comprise one or more of the following: an absolute movement velocity range of a UE, a service type corresponding to data transmitted by a UE, a relative movement velocity range of a UE and other UEs surrounding the UE, a relative distance range between a UE and a potentially dangerous vehicle, a geographic location (e.g., GPS coordinates) of a UE, and a UE density range in an environment of a UE. The UE determines to select a corresponding power control parameter according to the current state. The determining a transmission power in step 120 is performed according to the selected power control parameter. Thus, by selecting a value of the power control parameter according to its own current state by the UE itself, the adjustment of the transmission power is controlled, and the interference between V2X UEs can be controlled more effectively.

Wherein, a correspondence between UE states and the power control parameters can be configured by the eNB or defined by the standard.

To easily understand the present application, the technical solutions of the present application will be further described below with reference to specific applications.

Embodiment 1

In this embodiment, the UE is in coverage of a cell, and the UE determines, by receiving a configuration signaling from the eNB, power control parameters of a resource pool transmitting a PVSCH and a PVCCH or a region where the UE is located, and further determines a power of the PVSCH and a power of the PVCCH. Specifically, the method comprises the following steps.

Step 210: By a UE, resource-pool-specific or region-specific power control parameters of the PVSCH and PVCCH are determined by receiving a signaling from an eNB.

The signaling can be a broadcast message, a UE-specific RRC configuration message, a MAC layer message or a physical layer signaling. The same is applicable hereinafter.

The power control parameters of the PVSCH comprise: $P_{CMAX\_PVSCH}$, $P_{o\_PVSCH}$, $\alpha_{PVSCH}$ and $P_{o\_PVSCH\_PC5}$; while the power control parameters of the PVCCH comprise: $P_{CMAX\_PVCCH}$, $P_{o\_PVCCH}$, $\alpha_{PVCCH}$ and $P_{o\_PVCCH\_PC5}$. Wherein, $P_{CMAX\_PVSCH}/P_{CMAX\_PVCCH}$ is a maximum PVSCH/PVCCH transmission power configured by the eNB, and "/" denotes "or". The power control parameters can be resource-pool-specific or region-specific.

If the power control parameters are resource-pool-specific, it is assumed that the resource pool for the UE to transmit the PVSCH and the PVCCH is P, then $P_{o\_PVSCH}/P_{o\_PVCCH}$ is a first basic open-loop power of the PVSCH/PVCCH in the resource pool P configured by the eNB, $\alpha_{PVSCH}/\alpha_{PVCCH}$ is a path loss compensation factor of the PVSCH/PVCCH transmission power in the resource pool P configured by the eNB, and $P_{o\_PVSCH\_PC5}/P_{o\_PVCCH\_PC5}$ is a second basic open-loop power of the PVSCH/PVCCH in the resource pool P configured by the eNB.

Figure 2:
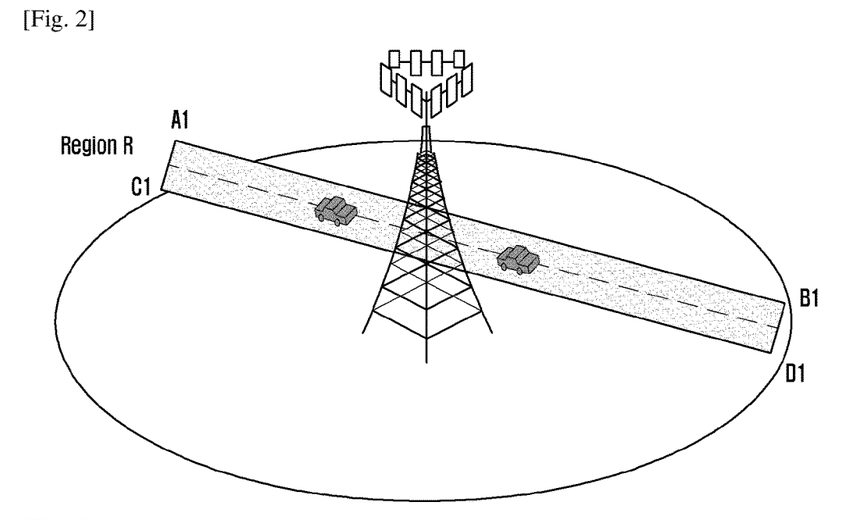
FIG. 2 is a schematic diagram of region definition according to the present application.

If the power control parameters are region-specific, it is assumed that the region where the UE is located is R, then $P_{o\_PVSCH}/P_{o\_PVCCH}$ is a first basic open-loop power of the PVSCH/PVCCH in the region R configured by the eNB, $\alpha_{PVSCH}/\alpha_{PVCCH}$ is path loss compensation factor of the PVSCH/PVCCH transmission power in the region R configured by the eNB, and $P_{o\_PVSCH\_PC5}/P_{o\_PVCCH\_PC5}$ is a second basic open-loop power of the PVSCH/PVCCH in the region R configured by the eNB. Wherein, R can be a rectangular region, and the eNB indicates the specific position of the R by GPS coordinates of four vertexes of the R, as shown in FIG. 2. In addition, R can also be a circular region, and the eNB configures the specific position of the R according to the coordinates of a center and the radius of the R. In addition, R can also be a whole cell.

The second basic open-loop power $P_{o\_PVSCH\_PC5}/P_{o\_PVCCH\_PC5}$ is a parameter reflecting an interrelationship between different V2X UEs, for example, reflecting a maximum relative velocity between V2X UEs in a cell. The eNB can select, from all second basic open-loop power values, a second basic open-loop power value matched with the current maximum relativity velocity and then configure it for the UE. Of course, the second basic open-loop power is not limited to reflecting the maximum relative velocity of V2X UEs in a cell, and can also reflect an interrelationship between other V2X UEs. This is not limited in the present application.

Step 220: By the UE, a transmission power of the PVSCH and a transmission power of the PVCCH are determined according to the power control parameters acquired in the step 210.

The transmission power of the PVSCH is determined by the following formula:

$P_{PVSCH} = \min\{P_{CMAX\_PVSCH}, 10\log(M_{PVSCH}) + P_{o\_PVSCH\_PC5}, 10\log(M_{PVSCH}) + P_{o\_PVSCH} + \alpha_{PVSCH} * PL_c\}$; [dB]; and the transmission power of the PVCCH is determined by the following formula:

$$P_{PVCCH}=\min\{P_{CMAX\_PVCCH}, 10\log(M_{PVCCH})+P_{o\_PVCCH\_PC5}, 10\log(M_{PVCCH})+P_{o\_PVCCH}+\alpha_{PVCCH}*PL_c\}[\text{dB}];$$

where $M_{PVSCH}/M_{PVCCH}$ is the number of PRBs occupied by the PVSCH/PVCCH, and $PL_c$ is a path loss of a UE relative to the eNB.

Now, this embodiment ends. By the method provided by this embodiment, the eNB can adjust the transmission power of the PVSCH and the transmission power of the PVCCH according to the interrelationship between V2X UEs (e.g., the maximum relative velocity between V2X UEs in a cell, a traffic situation in the cell, etc.), so that the interference between V2X communications can be avoided in a simple method and the interference from the V2X communication to the cellular communication can also be avoided. However, in the method provided by this embodiment, the UE directly adjusts the transmission power of the PVSCH and the transmission power of the PVCCH according to the power control parameters configured by the eNB. The UE itself cannot further adjust the transmission power according to its own state since the power control parameters configured by the eNB are definite. On this basis, the application of this method in a UE out of coverage of the cell is not ideal. Although a UE state (e.g., movement velocity) in which PVSCH/PVCCH is transmitted in the resource pool P or the region R is different, this method cannot utilize the state of each UE to further adjust the power. Therefore, the power control granularity is not precise enough. In the following embodiments 2 to 5, further adjustments and controls will be performed on the power of the PVSCH and the power of the PVCCH by the UE itself in combination with the state of the UE.

Embodiment 2

In this embodiment, the UE can be out of coverage of a cell, and the UE determines power control parameters for transmitting a PVSCH and a PVCCH by receiving a configuration signaling from an eNB, wherein the second basic open-loop power is a set, and different elements in the set correspond to different UE absolute movement velocity ranges; and, the UE determines a transmission power according to its own absolute movement velocity. Specifically, the method comprises the following steps.

Step 310: By a UE, resource-pool-specific or region-specific power control parameters of the PVSCH and PVCCH are determined by receiving a signaling from an eNB.

The power control parameters of the PVSCH comprise: $P_{CMAX\_PVSCH}$, $P_{o\_PVSCH}$, $\alpha_{PVSCH}$ and $\{P_{o\_PVSCH\_PC5,i}|0\leq i\leq I-1\}$; while the power control parameters of the PVCCH comprise: $P_{CMAX\_PVCCH}$, $P_{o\_PVCCH}$, $\alpha_{PVCCH}$ and $\{P_{o\_PVCCH\_PC5,i}|0\leq i\leq I-1\}$. Wherein, $P_{CMAX\_PVSCH}$, $P_{CMAX\_PVCCH}$, $P_{o\_PVSCH}$, $P_{o\_PVCCH}$, $\alpha_{PVSCH}$ and $\alpha_{PVCCH}$ have the same meanings as in Embodiment 1.

$\{P_{o\_PVSCH\_PC5,i}|0\leq i\leq I-1\}/\{P_{o\_PVCCH\_PC5,i}|0\leq i\leq I-1\}$ is a second basic open-loop power set of the PVSCH/PVCCH in a resource pool P or region R configured by the eNB, and the number I of elements in each set can be configured by the eNB or defined by the standard. Different elements in the set correspond to different absolute movement velocity $V_a$ ranges. For example, $P_{o\_PVSCH\_PC5,0}/P_{o\_PVCCH\_PC5,0}$ corresponds to a low velocity, $P_{o\_PVSCH\_PC5,1}/P_{o\_PVCCH\_PC5,1}$ corresponds to a medium velocity, and $P_{o\_PVSCH\_PC5,2}/P_{o\_PVCCH\_PC5,2}$ corresponds to a high velocity. The absolute movement velocity ranges corresponding to the low velocity, medium velocity and high velocity can be defined by the standard or configured by the eNB. Or, if $i<I-1$, $P_{o\_PVSCH\_PC5,i}/P_{o\_PVCCH\_PC5,i}$ corresponds to an absolute movement velocity $V_a$ range $[iV_{max}/I, (i+1)V_{max}/I)$; and, if $i=I-1$, $P_{o\_PVSCH\_PC5,i}/P_{o\_PVCCH\_PC5,i}$ corresponds to an absolute movement velocity $V_a$ range $[iV_{max}/I, +\infty)$. Where, $V_{max}$ is a maximum UE absolute velocity defined by the standard or configured by the eNB.

In addition, preferably, the higher the velocity indicated by the absolute movement velocity range of the UE is, the higher the second basic open-loop power is.

Step 320: By the UE, a corresponding second basic open-loop power parameter is determined according to the current $V_a$.

$V_a$ can be a current instant movement velocity $V_1$; or $V_a=V_1+0.5A_1$, $V_a$ reflecting a movement distance of the UE within a unit time in this case, where $A_1$ is a current instant acceleration; or, $V_a=V_1+\Delta A_1$, where $\Delta$ is an expected physical layer delay or a half of the expected physical layer delay of data carried by the PVSCH/PVCCH, for example, $\Delta$ is 100 ms or 50 ms.

A second basic open-loop power parameter index J used by the UE is determined by the following formula: $j=\lfloor v_a I/v_{max}\rfloor$. Thus, the corresponding second basic open-loop parameter value can be determined according to the current absolute movement velocity of the UE.

Step 330: By the UE, a transmission power of the PVSCH and a transmission power of the PVCCH are determined according to the power control parameters determined in the steps 310 and 320.

The transmission power of the PVSCH is determined by the following formula:

$$P_{PVSCH}=\min\{P_{CMAX\_PVSCH}, 10\log(M_{PVSCH})+P_{o\_PVSCH\_PC5,j}, 10\log(M_{PVSCH}), P_{o\_PVSCH}+\alpha_{PVSCH}*PL_c\}[\text{dB}]; \text{ and}$$

the transmission power of the PVCCH is determined by the following formula:

$$P_{PVCCH}=\min\{P_{CMAX\_PVCCH}, 10\log(M_{PVCCH})+P_{o\_PVCCH\_PC5,j}, 10\log(M_{PVCCH}), P_{o\_PVCCH}+C(\alpha_{PVCCH}*PL_c)\};$$

where $M_{PVSCH}/M_{PVCCH}$ is the number of PRBs occupied by the PVSCH/PVCCH, and $PL_c$ is a path loss of a UE relative to the eNB.

Now, this embodiment ends. In comparison to the method in Embodiment 1, this embodiment enables each UE to adjust the transmission power according to its own absolute movement velocity, and more precise power control can thus be obtained.

Embodiment 3

In this embodiment, the UE is out of coverage of a cell, and the UE determines power control parameters of a resource pool transmitting a PVSCH and a PVCCH by preconfiguration and then determines a transmission power according to its own state. Specifically, the method comprises the following steps.

Step 410: By a UE, resource-pool-specific power control parameters of the PVSCH and PVCCH are determined according to a preconfiguration.

It is assumed that the resource pool for the UE to transmit the PVSCH and the PVCCH is P, the power control parameters of the PVSCH comprise $P_{CMAX\_PVSCH\_pre}$ and $P_{o\_PVSCH\_PC5\_pre}$, and the power control parameters of the PVCCH comprise $P_{CMAX\_PVCCH\_pre}$ and $P_{o\_PVCCH\_PC5\_pre}$. Or, the power control parameters of the PVSCH comprise $P_{CMAX\_PVSCH\_pre}$ and $P_{o\_PVSCH\_PC5\_pre}$. Or, the power control parameters of the PVSCH comprise $P_{CMAX\_PVCCH\_pre}$ and $\{P_{o\_PVCCH\_PC5\_pre,i}|0\leq i<I-1\}$, and the power control parameters of the PVCCH comprise $P_{CMAX\_PVCCH\_pre}$ and $\{P_{o\_PVCCH\_PC5\_pre,i}|0\leq i<I-1\}$. Wherein, $P_{CMAX\_PVSCH\_pre}/P_{CMAX\_PVCCH\_pre}$ is a preconfigured maximum PVSCH/PVCCH transmission power, $P_{o\_PVSCH\_PC5\_pre}/P_{o\_PVCCH\_PC5\_pre}$ is a second basic open-loop power of the PVSCH/PVCCH in the preconfigured resource pool P, $\{P_{o\_PVSCH\_PC5\_pre,i}|0\leq i<I_{pre}-1\}/\{P_{o\_PVCCH\_PC5\_pre,i}|0\leq i<I-1\}$ is a second basic open-loop power set of the PVSCH/PVCCH in the preconfigured resource pool P, and the number I of elements in each set can be defined by the standard. Different elements in the set correspond to different absolute movement velocity $V_a$ ranges, the corresponding way is the same as in Embodiment 2.

Step 420: By the UE, a corresponding second basic open-loop power parameter value is determined according to the current $V_a$.

If the second basic open-loop power of the PVSCH/PVCCH is preconfigured in the form of a set in the step 401, this step is required to be executed; or otherwise, this step will be canceled.

The UE determines a corresponding second basic open-loop power parameter index J by the same method as in the step 320.

Step 430: By the UE, a transmission power of the PVSCH and a transmission power of the PVCCH are determined according to the power control parameters determined in the steps 410 and 420.

If the second basic open-loop power of the PVSCH/PVCCH is preconfigured in the form of a single numeral in the step 410, the power of the PVSCH is determined by the following formula:

$P_{PVSCH}=\min\{P_{CMAX\_PVSCH\_pre}, 10\log(M_{PVSCH})+P_{o\_PVSCH\_PC5\_pre}\}[\mathrm{dB}]$; and the transmission power of the PVCCH is determined by the following formula:

$P_{PVCCH}=\min\{P_{CMAX\_PVCCH\_pre}, 10\log(M_{PVCCH})+P_{o\_PVCCH\_PC5\_pre}\}[\mathrm{dB}]$; and If the second basic open-loop power of the PVSCH/PVCCH is preconfigured in the form of multiple numerals in the step 410, the power of the PVSCH is determined by the following formula:

$P_{PVSCH}=\min\{P_{CMAX\_PVSCH\_pre}, 10\log(M_{PVSCH})+P_{o\_PVSCH\_PC5\_pre,J}\}[\mathrm{dB}]$; and the transmission power of the PVCCH is determined by the following formula:

$P_{PVCCH}=\min\{P_{CMAX\_PVCCH\_pre}, 10\log(M_{PVCCH})+P_{o\_PVCCH\_PC5\_pre,J}\}[\mathrm{dB}]$ where $M_{PVSCH}/M_{PVCCH}$ is the number of PRBs occupied by the PVSCH/PVCCH.

Now, this embodiment ends. By the method provided by this embodiment, the transmission power of a UE out of coverage of a cell can be controlled, and the mutual interference in the V2X communication can be further reduced according to the absolute movement velocity of the UE.

Embodiment 4

In this embodiment, the UE can be in coverage of a cell. Typically, the UE is a UE that moves slowly, that is, the average movement velocity is far lower than that of a car. The UE determines, by receiving a configuration signaling from an eNB, power control parameters of a resource pool transmitting a PVSCH and a PVCCH or a region where the UE is located, wherein the second basic open-loop power is a set, and different elements in the set correspond to different relative distances. Then, the UE determines a distance to the farthest potentially dangerous vehicle according to the signal received from a vehicle-mounted terminal, and determines a transmission power according to this distance. Specifically, the method comprises the following steps.

Step 510: By a UE, resource-pool-specific power control parameters of the PVSCH and PVCCH are determined by receiving a signaling from an eNB.

The power control parameters of the PVSCH comprise: $P_{CMAX\_PVSCH}$, $P_{o\_PVSCH}$, $\alpha_{PVSCH}$ and $\{P_{o\_PVSCH\_PC5,i}|0\leq i<I-1\}$; and the power control parameters of the PVCCH comprise: $P_{CMAX\_PVCCH}$, $P_{o\_PVCCH}$, $\alpha_{PVCCH}$ and $\{P_{o\_PVCCH\_PC5,i}|0\leq i<I-1\}$. Wherein, $P_{CMAX\_PVSCH}$, $P_{CMAX\_PVCCH}$, $P_{o\_PVSCH}$, $P_{o\_PVCCH}$, $\alpha_{PVSCH}$ and $\alpha_{PVSCH}$ have the same meanings as in Embodiment 1. $\{P_{o\_PVSCH\_PC5,i}|0\leq i<I-1\}/\{P_{o\_PVCCH\_PC5,i}|0\log\leq i<I-1\}$ a second basic open-loop power set of the PVSCH/PVCCH in the resource pool P or region R configured by the eNB, and the number I of elements in each set can be configured by the eNB or defined by the standard. Different elements in the set correspond to different relative distance intervals. More specifically, the $i^{th}$ element in the set corresponds to the $i^{th}$ relative distance interval. For example, $P_{o\_PVSCH\_PC5,0}/P_{o\_PVCCH\_PC5,0}$ corresponds to a short distance, $P_{o\_PVSCH\_PC5,1}/P_{o\_PVCCH\_PC5,1}$ corresponds to a medium distance, and $P_{o\_PVSCH\_PC5,2}/P_{o\_PVCCH\_PC5,2}$ corresponds to a long distance. The distance sizes corresponding to the short distance, the medium distance and the long distance can be defined by the standard or configured by the eNB. Or, $P_{o\_PVSCH\_PC5,i}/P_{o\_PVCCH\_PC5,i}$ corresponds to a relative distance $D_r$ range $[iD_{max}/I, (i+1)D_{max}/I]$, where $D_{max}$ is a maximum relative distance defined by the standard or configured by the eNB. Or, $P_{o\_PVSCH\_PC5,i}/P_{o\_PVCCH\_PC5,i}$ corresponds to the $i^{th}$ distance interval, where the range of the $i^{th}$ distance interval is configured by the eNB or defined by the standard.

Wherein, preferably, the larger the distance indicated by the relative distance range between the UE and a potentially dangerous vehicle is, the higher the second basic open-loop power is.

Step 520: By the UE, a corresponding second basic open-loop power parameter is determined according to the current maximum relative distance to a potentially dangerous vehicle.

Wherein, the potentially dangerous vehicle refers to all vehicles with a distance to the UE less than $D_{max}$. Or, the potentially dangerous vehicle refers to all vehicles with a time for meeting the current UE less than T, where T is a value defined by the standard, for example, T=4 s. That is, $D_{r,j}\leq V_{r,j}T+0.5A_{r,j}T^2$, where $D_{r,j}$ is a relative distance between a vehicle j and the current UE, $V_{r,j}$ is a relative velocity of the both, $A_{r,j}$ is a relative acceleration of the both, and the meeting means that the vehicle and the current UE will arrive at a same position at a certain moment in accordance with the current movement trajectory; or, a criteria for a potentially dangerous vehicle is determined by the UE.

A second basic open-loop power parameter index J shall be used by the UE is a relative distance interval index corresponding to the maximum relative distance between the UE and the potentially dangerous vehicle. For example, if $P_{o\_PVSCH\_PC5,i}/P_{o\_PVCCH\_PC5,i}$ corresponds to a relative distance $D_r$ range $[iD_{max}/I, (i+1)D_{max}/I)$, the value of J is determined by the following formula:

$$j = \lfloor \max(D_{r,j}) I/D_{max} \rfloor, \text{ where } \max(D_{r,j})$$

is a maximum relative distance, detected by the UE, between a potentially dangerous vehicle and the UE.

Step 530: By the UE, a transmission power of the PVSCH and a transmission power of the PVCCH are determined according to the power control parameters determined in the steps 510 and 520.

The transmission power of the PVSCH is determined by the following formula:

$$P_{PVSCH} = \min\{P_{CMAX\_PVSCH}, 10 \log(M_{PVSCH}) + P_{o\_PVSCH\_PC5,J}, 10 \log(M_{PVSCH}) + P_{o\_PVSCH} + \alpha_{PVSCH} * PL_c\}[dB]; \text{ and}$$

the transmission power of the PVCCH is determined by the following formula:

$$P_{PVCCH} = \min\{P_{CMAX\_PVCCH}, 10 \log(M_{PVCCH}) + P_{o\_PVCCH\_PC5,J}, 10 \log(M_{PVCCH}) + P_{o\_PVCCH} + \alpha_{PVCCH} * PL_c\}[dB];$$

where $M_{PVSCH}/M_{PVCCH}$ is the number of PRBs occupied by the PVSCH/PVCCH, and $PL_c$ is a path loss of a UE relative to the eNB.

It is to be specifically noted that, if a UE does not detect any potentially dangerous vehicle, preferably, the UE can stop transmitting the PVSCH/PVCCH, or transmit the PVSCH/PVCCH at a minimum power.

Now, this embodiment ends. In comparison to the method in Embodiment 1, in this embodiment, the UE can determine a corresponding transmission power according to the maximum distance to a potentially dangerous vehicle, and can stop transmitting the PVSCH/PVCCH when there is no potentially dangerous vehicle, so that the utilization of energy can be effectively improved. The processing mode in this embodiment is particularly suitable for a low-speed UE.

Embodiment 5

In this embodiment, the UE can be out of coverage of a cell. Typically, the UE is a UE that moves slowly, that is, the average movement velocity is far lower than that of a car. The UE determines, by preconfiguration, power control parameters of a resource pool transmitting a PVSCH and a PVCCH or a region where the UE is located, wherein the second basic open-loop power is a set, and different elements in the set correspond to different relative distances. Then, the UE determines a distance to the farthest potentially dangerous vehicle according to the signal received from a vehicle-mounted terminal, and determines a transmission power according to this distance. Specifically, the method comprises the following steps.

Step 610: By a UE, resource-pool-specific power control parameters of the PVSCH and PVCCH are determined by preconfiguration.

It is assumed that a resource pool for the UE to transmit the PVSCH and the PVCCH is P, the power control parameters of the PVSCH comprise $P_{CMAX\_PVSCH\_pre}$ and $P_{o\_PVSCH\_PC5\_pre}$, and the power control parameters of the PVCCH comprise $P_{CMAX\_PVCCH\_pre}$ and $P_{o\_PVCCH\_PC5\_pre}$; or, the power control parameters of the PVSCH comprise $P_{CMAX\_PVSCH\_pre}$ and $\{P_{o\_PVSCH\_PC5\_pre,i}|0 \leq i < I-1\}$, and the power control parameters of the PVCCH comprise $P_{CMAX\_PVCCH\_pre}$ and $\{P_{o\_PVCCH\_PC5,i}|0 \leq i < I-1\}$. Wherein, $P_{CMAX\_PVSCH\_pre}/P_{CMAX\_PVCCH\_pre}$ is a preconfigured maximum PVSCH/PVCCH transmission power, $P_{o\_PVSCH\_PC5\_pre}/P_{o\_PVCCH\_PC5\_pre}$ is a second basic open-loop power of the PVSCH/PVCCH in the preconfigured resource pool P. $\{P_{o\_PVSCH\_PC5\_pre,i}|0 \leq i < I-1\}/\{P_{o\_PVCCH\_PC5\_pre,i}|0 \leq i < I-1\}$ is a second basic open-loop power set of the PVSCH/PVCCH in the preconfigured resource pool P, and the number I of elements in each set can be defined by the standard. Different elements in the set correspond to different relative distances $D_r$, the corresponding way is the same as in Embodiment 4.

Step 620: By the UE, a corresponding second basic open-loop power parameter value is determined according to the current maximum relative distance to a potentially dangerous vehicle.

If the second basic open-loop power of the PVSCH/PVCCH is preconfigured in the form of a set in the step 610, this step is required to be executed; or otherwise, this step will be canceled.

The UE determines a corresponding second basic open-loop power parameter index J by the same method as in the step 520.

Step 630: By the UE, a transmission power of the PVSCH and a transmission power of the PVCCH are determined according to the power control parameters determined in the steps 610 and 620.

If the second basic open-loop power of the PVSCH/PVCCH is preconfigured in the form of a single numeral in the step 610, the power of the PVSCH is determined by the following formula:

$$P_{PVSCH} = \min\{P_{CMAX\_PVSCH\_pre}, 10 \log(M_{PVSCH}) + P_{o\_PVSCH\_PC5\_pre}\}[dB]; \text{ and}$$

the transmission power of the PVCCH is determined by the following formula:

$$P_{PVCCH} = \min\{P_{CMAX\_PVCCH\_pre}, 10 \log(M_{PVCCH}) + P_{o\_PVCCH\_PC5\_pre}\}[dB]; \text{ and}$$

If the second basic open-loop power of the PVSCH/PVCCH is preconfigured in a manner of a set comprising multiple of numeral in step 610, the power of the PVSCH is determined by the following formula:

$$P_{PVSCH} = \min\{P_{CMAX\_PVSCH\_pre}, 10 \log(M_{PVSCH}) + P_{o\_PVSCH\_PC5\_pre,J}\}[dB]; \text{ and}$$

the transmission power of the PVCCH is determined by the following formula:

$$P_{PVCCH} = \min\{P_{CMAX\_PVCCH\_pre}, 10 \log(M_{PVCCH}) + P_{o\_PVCCH\_PC5\_pre,J}\}[dB];$$

where $M_{PVSCH}/M_{PVCCH}$ is the number of PRBs occupied by the PVSCH/PVCCH.

Now, this embodiment ends. By the method provided by this embodiment, the accurate control on the power of a UE out of coverage of a cell is realized, and the mutual interference in the V2X communication can be further reduced according to the relative distance between UEs. Similarly to Embodiment 4, this embodiment is particularly suitable for a low-speed UE.

In Embodiments 2 to 5, the processing of selecting a power control parameter value from a set according to the current UE state is disclosed, where the description is given by taking the absolute movement velocity range of a UE and relative distance range as the current UE state as an example. Of course, the current UE state, on which the determination of a power control parameter value is based, is not limited to the above two cases, and other cases can also be used. For example, the current UE state is a service type corresponding to data transmitted by a UE, a relative movement velocity range between a UE and other UEs surrounding the UE, a geographic location range of a UE, and/or a UE density range in an environment of a UE. Wherein, preferably, the higher the velocity indicated by the absolute movement velocity range of the UE is, the higher the second basic open-loop power is; and/or, the larger the distance indicated by the relative distance range between the UE and the potentially dangerous vehicle is, the higher the second basic open-loop power is; and/or, the higher the velocity indicated by the relative movement velocity range between UEs is, the higher the second basic open-loop power is; and/or, the larger the density indicated by the UE density range in the environment of the UE is, the lower the second basic open-loop power is.

Figure 3:
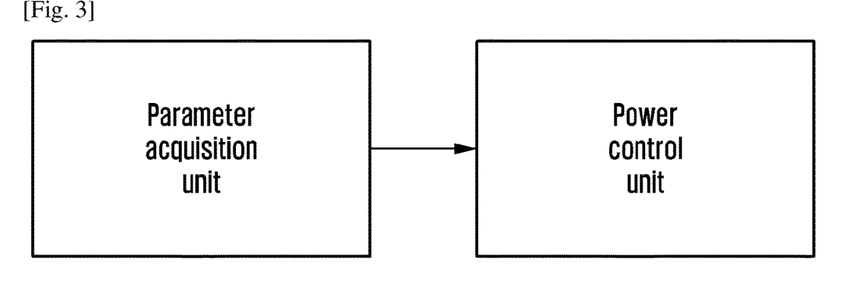
FIG. 3 is a structural diagram of a power control apparatus in a V2X communication according to the present application.

The present application further provides a power control apparatus in a V2X communication, which can be used for implementing the methods described above. FIG. 3 is a basic structure diagram of the power control apparatus according to the present application. As shown in FIG. 3, the apparatus comprises a parameter acquisition unit and a power control unit.

Wherein, the parameter acquisition unit is configured to acquire power control parameters of a PVSCH or a PVCCH in a V2X communication. The power control unit is configured to determine a transmission power of the PVSCH or the PVCCH according to the acquired power control parameters.

It can be understood by a person of ordinary skill in the art that all of or a part of steps in the embodiment methods can be implemented by instructing related hardware by programs. The programs can be stored in a computer-readable storage medium, and, when executed, include one or a combination of the steps of the method embodiments.

In addition, each functional unit in each embodiment of the present application can be integrated into a processing module; or, each unit can exist alone physically; or, two or more units can be integrated into one module. The integrated module can be implemented in the form of hardware, or can be implemented the form of a software functional module. If the integrated module is implemented in the form of a software functional module and sold or used as an independent product, the integrated module can also be stored in a computer-readable storage medium.

The storage medium can be a read-only memory, a magnetic disk, an optical disk, etc.

The preceding description merely shows preferred embodiments of the present application and is not intended to limit the present application. Any modification, equivalent replacement or improvement made within the spirit and principle of the present application shall fall into the protection scope of the present application.

The invention claimed is:

1. A power control method in a vehicle to x communication (V2X communication), characterized in that, the method comprising the following steps of:
   acquiring, by a user equipment (UE), power control parameters of a Physical V2X Shared Channel (PVSCH) or a Physical V2X Control Channel (PVCCH) in a V2X communication, the power control parameters comprising a second basic open-loop power, the second basic open-loop power reflecting an interrelationship between different V2X UEs; and
   determining, by the UE, a transmission power of the PVSCH or the PVCCH according to the acquired power control parameters,
   wherein the interrelationship between different V2X UEs indicates a maximum relative velocity between the different V2X UEs.

2. The method according to claim 1, characterized in that the step of determining a transmission power of the PVSCH or the PVCCH according to the acquired power control parameters comprises:
   by the UE, selecting, from the acquired power control parameters, a parameter value corresponding to a current UE state, and determining a transmission power of the PVSCH or the PVCCH according to the selected parameter value.

3. The method according to claim 2, characterized in that the power control parameters comprise one or more sets, and the sets comprise a multiple of parameter values corresponding to different UE states; and
   the selecting a parameter value corresponding to a current UE state comprises: determining, from the sets, a parameter value corresponding to the current state according to the current UE state,
   wherein, in the sets, a correspondence between UE states and parameter values is configured by an eNB or preset.

4. The method according to claim 3, characterized in that, when the UE is located within an IC range, the power control parameters are acquired by receiving a configuration signaling from the eNB;
   the power control parameters comprise: a maximum transmission power $P_{CMAX\_PVSCH}/P_{CMAX\_PVCCH}$ configured by the eNB for a PVSCH/PVCCH resource pool or a set region, a first basic open-loop power $P_{o\_PVSCH}/P_{o\_PVCCH}$ for the PVSCH/PVCCH resource pool or the set region, a path loss compensation factor $\alpha_{PVSCH}/\alpha_{PVCCH}$ for the PVSCH/PVCCH resource pool or the set region, and a second basic open-loop power set $\{P_{o\_PVSCH\_PC5,i}|0\leq i<I-1\}/\{P_{o\_PVCCH\_PC5,i}|0\leq i<I-1\}$ for the PVSCH/PVCCH resource pool or the set region, wherein different parameter values in the second basic open-loop power set correspond to different UE states, and I is a positive integer predefined or configured by the eNB; and
   the determining a transmission power of the PVSCH according to the selected parameter value comprises: $P_{PVSCH}=\min\{P_{CMAX\_PVSCH}, 10 \log(M_{PVSCH})+P_{o\_PVSCH\_PC5,J}, 10 \log(M_{PVSCH})+P_{o\_PVSCH}+\beta_{PVSCH}*PL_c\}$; and/or, the determining a transmission power of the PVCCH according to the selected parameter value comprises: $P_{PVCCH}=\min\{P_{CMAX\_PVCCH}, 10 \log(M_{PCCCH})+P_{o\_PVCCH\_PC5,J}, 10 \log(M_{PVCCH})+P_{o\_PVCCH}+\alpha_{PVCCH}*PL_c\}$;
   wherein $M_{PVSCH}/M_{PVCCH}$ is the number of PRBs occupied by the PVSCH/PVCCH, $PL_c$ is a path loss of a UE relative to the eNB, and "/" denotes "or".

5. The method according to claim 4, characterized in that a UE state corresponding to different parameter values of the second basic open-loop power is an absolute movement velocity range;
   when selecting a parameter value corresponding to the current UE state, for the second basic open-loop power, an absolute movement velocity range into which an absolute movement velocity $V_a$ falls is determined according to the current absolute movement velocity $V_a$ of the UE, and a parameter value $P_{o\_PVSCH\_PC5,J}$ corresponding to the absolute movement velocity range is selected, where J is an index of the selected parameter value.

6. The method according to claim 5, characterized in that the absolute movement velocity range is configured by the eNB or preset; or,
   if i<I-1, the absolute movement velocity range corresponding to $P_{o\_PVSCH\_PC5,i}/P_{o\_PVCCH\_PC5,i}$ is [$iV_{max}/$ I,(i+1)V$_{max}$/I); and, if i=I−1, the absolute movement velocity range corresponding to P$_{o\_PVSCH\_PC5,i}$/P$_{o\_PVCCH\_PC5,i}$ is [iV$_{max}$/I,+∞), where V$_{max}$ is a maximum UE absolute velocity predefined or configured by the eNB.

7. The method according to claim 5, characterized in that a way of determining a current absolute movement velocity V$_a$ of the UE comprises:
using a current instant movement velocity V$_I$ of the UE as the V$_a$; or
V$_a$=V$_I$+0.5A$_I$ where A$_I$ is a current instant acceleration; or
V$_a$=V$_I$+ΔA$_I$, where Δ is an expected physical layer delay or a half of the expected physical layer delay of data carried by PVSCH/PVCCH.

8. The method according to claim 5, characterized in that, J=⌊V$_a$/V$_{max}$⌋, where V$_{max}$ is a maximum UE absolute velocity predefined or configured by the eNB.

9. The method according to claim 4, characterized in that a UE state corresponding to different parameter values of the second basic open-loop power is a relative distance range between a UE and a potentially dangerous vehicle; and
when selecting a parameter value corresponding to the current UE state, for the second basic open-loop power, a relative distance range into which a maximum relative distance falls is determined according to the maximum relative distance between the current UE and the potentially dangerous vehicle, and a parameter value P$_{o\_PVSCH\_PC5,J}$ corresponding to the relative distance range is selected, wherein J is an index of the selected parameter value,
wherein the relative distance range is configured by the eNB or preset; or, the relative distance range corresponding to P$_{o\_PVSCH\_PC5,i}$/P$_{o\_PVCCH\_PC5,i}$ is [iD$_{max}$/I,(i+1)D$_{max}$/I), where D$_{max}$ is a maximum relative distance predefined or configured by the eNB,
wherein a vehicle with a relative distance to the UE smaller than D$_{max}$ is used as a potentially dangerous vehicle; and
when the relative distance range corresponding to P$_{o\_PVSCH\_PC5,i}$/P$_{o\_PVCCH\_PC5,i}$ is [iDmax/I,(i+1)Dmax/I), J=⌊max(D$_{r,j}$)/D$_{max}$⌋, where max(D$_{r,j}$) denotes the maximum relative distance,
wherein if there is no potentially dangerous vehicle, the method comprises: by the UE, stopping transmitting the PVSCH/PVCCH, or transmitting the PVSCH/PVCCH at a minimum power.

10. The method according to claim 3, characterized in that, when the UE is located within an IC range, the power control parameters are acquired by preconfiguration;
the power control parameters comprise: a preconfigured maximum transmission power P$_{CMAX\_PVSCH\_pre}$/P$_{CMAX\_PVCCH\_pre}$ and a second basic open-loop power set {P$_{o\_PVSCH\_PC5\_pre,i}$|0≤i<I−1}/{P$_{o\_PVCCH\_PC5\_pre,i}$|0≤i<I−1} for a PVSCH/PVCCH resource poor, wherein different parameter values in the second basic open-loop power set correspond to different UE states, and
the determining a transmission power of the PVSCH comprises: P$_{PVSCH}$=min{P$_{CMAX\_PVSCH\_pre}$, 10 log (M$_{PVSCH}$)+P$_{o\_PVSCH\_PC5\_pre,J}$}; and/or, the determining a transmission power of the PVCCH comprises: P$_{PVCCH}$=min{P$_{CMAX\_PVCCH\_pre}$, 10 log(M$_{PCCCH}$)+P$_{o\_PVCCH\_PC5\_pre,J}$};
where M$_{PVSCH}$/M$_{PVCCH}$ is the number of PRBs occupied by the PVSCH/PVCCH.

11. The method according to claim 2, characterized in that the UE state is one of or a combination of several of the following: an absolute movement velocity range of a UE, a service type corresponding to data transmitted by a UE, a relative distance range between a UE and a potentially dangerous vehicle, a relative movement velocity range between UEs, a geographic location range of a UE, and a UE density range in an environment of a UE.

12. The method according to claim 11, characterized in that, when the second basic open-loop power is a set comprising a multiple of parameter values,
the higher the velocity indicated by the absolute movement velocity range of the UE is, the higher the second basic open-loop power is; and/or
the larger the distance indicated by the relative distance range between the UE and the potentially dangerous vehicle is, the higher the second basic open-loop power is; and/or,
the higher the velocity indicated by the relative movement velocity range between UEs is, the higher the second basic open-loop power is; and/or
the larger the density indicated by the UE density range in the environment of the UE is, the lower the second basic open-loop power is.

13. The method according to claim 1, characterized in that the power control parameters are acquired by receiving a configuration signaling from an evolved Node B (eNB) or by preconfiguration,
wherein when the UE is located within an In Coverage (IC) range, the power control parameters are acquired by receiving a configuration signaling from an eNB;
the power control parameters comprise: a maximum PVSCH/PVCCH transmission power P$_{CMAX\_PVSCH}$/P$_{CMAX\_PVCCH}$, configured by the eNB, a first basic open-loop power P$_{o\_PVSCH}$/P$_{o\_PVCCH}$ for a PVSCH/PVCCH resource pool or a set region, a path loss compensation factor α$_{PVSCH}$/β$_{PVCCH}$ for the PVSCH/PVCCH resource pool or the set region, and a second basic open-loop power P$_{o\_PVSCH\_PC5}$/P$_{o\_PVCCH\_PC5}$ for the PVSCH/PVCCH resource pool or the set region; and
the determining a transmission power of the PVSCH comprises: P$_{PVSCH}$=min{P$_{CMAX\_PVSCH}$, 10 log (M$_{PVSCH}$)+P$_{o\_PVSCH\_PC5}$, 10 log(M$_{PVSCH}$)+P$_{o\_PVSCH}$+α$_{PVSCH}$*PL$_c$}; and/or, the determining a transmission power of the PVCCH comprises: P$_{PVCCH}$=min{P$_{CMAX\_PVCCH}$, 10 log(M$_{PCCCH}$)+P$_{o\_PVCCH\_PC5}$, 10 log(M$_{PVCCH}$)+P$_{o\_PVCCH}$+α$_{PVCCH}$*PL$_c$};
wherein, M$_{PVSCH}$/M$_{PVCCH}$ is the number of Physical Resource Blocks (PRBs) occupied by the PVSCH/PVCCH, PL$_c$ is a path loss of a UE relative to the eNB, and "/" denotes "or".

14. The method according to claim 1, characterized in that the power control parameters are determined by one or more of the following information:
a cell where the UE is located currently, a frequency of a transmitting carrier where the UE is located currently, a transmitting resource pool where the UE is located currently, and a service type corresponding to data to be transmitted by the UE currently.

15. A power control apparatus in a vehicle to x communication (V2X communication), characterized in that, the power control apparatus comprising:
a parameter acquisition unit and a power control unit,
wherein the parameter acquisition unit is configured to acquire power control parameters of a PVSCH or a PVCCH in a V2X communication, the power control parameters comprising a second basic open-loop power, the second basic open-loop power reflecting an interrelationship between different V2X UEs, wherein the power control unit is configured to determine a transmission power of the PVSCH or the PVCCH according to the acquired power control parameters, and wherein the interrelationship between different V2X UEs indicates a maximum relative velocity between the different V2X UEs.

* * * * *